US012650339B2

(12) United States Patent
Brosnan et al.

(10) Patent No.: US 12,650,339 B2
(45) Date of Patent: Jun. 9, 2026

(54) SENSORS FOR MEASURING PRESSURE AND TEMPERATURE

(71) Applicant: Simmonds Precision Products, Inc., Vergennes, VT (US)

(72) Inventors: Kristen Brosnan, Colchester, VT (US); Peter J. Carini, Underhill, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 152 days.

(21) Appl. No.: 18/199,230

(22) Filed: May 18, 2023

(65) Prior Publication Data

US 2024/0385040 A1     Nov. 21, 2024

(51) Int. Cl.
G01J 3/26          (2006.01)
G01J 3/02          (2006.01)

(52) U.S. Cl.
CPC ............... G01J 3/26 (2013.01); G01J 3/0218 (2013.01); G01J 3/024 (2013.01)

(58) Field of Classification Search
CPC   G01J 3/26; G01J 3/0218; G01J 3/024; G01D 5/268; G01D 5/35312; G01L 9/0079; G01K 5/58
See application file for complete search history.

(56) References Cited

U.S. PATENT DOCUMENTS

| | | | |
|---|---|---|---|
| 5,142,266 A | 8/1992 | Friese et al. | |
| 6,248,539 B1 | 6/2001 | Ghadiri et al. | |
| 6,516,671 B2 | 2/2003 | Romo et al. | |
| 7,503,220 B2 | 3/2009 | Sittler et al. | |
| 7,614,308 B2 | 11/2009 | Berner et al. | |
| 7,779,698 B2 | 8/2010 | Willcox | |
| 9,804,033 B2 | 10/2017 | Dong et al. | |
| 10,495,525 B2 | 12/2019 | Dong et al. | |
| 11,150,144 B2 | 10/2021 | Dong et al. | |
| 2002/0003917 A1* | 1/2002 | Sherrer ................... | G01L 23/16 |
| | | | 73/705 |

(Continued)

FOREIGN PATENT DOCUMENTS

| | | | |
|---|---|---|---|
| CN | 106289570 A | * | 1/2017 |
| JP | 2007298368 A | * | 11/2007 |

OTHER PUBLICATIONS

CN106289570A translation (Year: 2017).*

(Continued)

*Primary Examiner* — Tarifur R Chowdhury
*Assistant Examiner* — Carlos Perez-Guzman
(74) *Attorney, Agent, or Firm* — Tucker Ellis LLP

(57)          ABSTRACT

A Fabry-Pérot sensor assembly includes an optical element defining a Fabry-Pérot optical cavity therein. A ferrule is affixed to the optical element. The ferrule is configured to physically connect to an optic fiber, aligning the optic fiber optically with the cavity. The optical element includes a MgAl2O4 spinel or aluminum oxynitride $Al_{23}N_{27}O_5$. A method of making an Fabry-Pérot optical cavity includes using a ceramic processing etching process to remove material from a first optical member to form the cavity therein, leaving a rim of the optical member surrounding the cavity peripherally. The method includes affixing a second optical member to the rim to enclose the cavity.

15 Claims, 3 Drawing Sheets

(56)          References Cited

U.S. PATENT DOCUMENTS

| | | | |
|---|---|---|---|
| 2012/0028725 A1* | 2/2012 | Priegel .................. | A63B 57/40 |
| | | | 473/176 |
| 2015/0202846 A1* | 7/2015 | Byker .............. | B32B 17/10761 |
| | | | 204/192.27 |
| 2020/0132561 A1* | 4/2020 | Dong .................... | G01D 5/268 |
| 2023/0393005 A1* | 12/2023 | Lopushansky ...... | G01L 19/0627 |

OTHER PUBLICATIONS

JP2007298368 translation (Year: 2007).*
Extended European Search Report for EP Application No. 24176657.
5, dated Oct. 15, 2024, 9 pages.

* cited by examiner

SENSORS FOR MEASURING PRESSURE AND TEMPERATURE

BACKGROUND

1. Field

The present disclosure relates to sensors for pressure and temperature, and more particularly to Fabry-Pérot cavity optical sensors for pressure and temperature.

2. Description of Related Art

Fabry-Pérot cavity sensors can measure pressure, temperature, or both. The sensor includes a diaphragm that responds to a change in temperature or pressure, a base connected to the diaphragm, an optical cavity, and an optical fiber that may conduct light reflected off of a surface of the diaphragm. An interrogator may be provided for detecting a deflection of the diaphragm. Changes in size of the cavity change the interference of reflected light in the interrogator, which can be calibrated to infer temperature or pressure or both.

The conventional techniques have been considered satisfactory for their intended purpose. However, there is an ever present need for improved systems and methods for Fabry-Pérot cavity optical sensors. This disclosure provides a solution for this need.

SUMMARY

A Fabry-Pérot sensor assembly includes an optical element defining a Fabry-Pérot optical cavity therein. A sensor ferrule is affixed to the optical element. The sensor ferrule is configured to physically connect to an optical fiber, aligning the optical fiber optically with the cavity. The optical element includes $MgAl_2O_4$ spinel.

The optical fiber can be affixed within the sensor ferrule optically aligned with the cavity. The sensor ferrule can include external features configured of mechanical attachment of the sensor ferrule to a housing. An interrogator can be optically connected to the optical fiber. The interrogator can be configured to illuminate the cavity through the optical fiber, to receive reflected spectrum from the cavity, and to measure temperature and/or pressure of the cavity based on the reflected spectrum.

The sensor ferrule can define a bore for receiving the optical fiber which may contain a fiber ferrule. The bore can extend along a longitudinal axis that extends through the cavity. The cavity can be defined between a first optical member and a third optical member spaced apart from the first optical member thus forming the second optical member along the longitudinal axis. An optical path is created from the bore, through the first optical member, through the cavity constituting the second optical member, allowing light to reflect off of the third optical member thus passing back through the cavity and through the first optical member into the bore and back into the fiber.

The third optical member can be an endplate with an at least partially mirrored surface for increasing signal reflections through the cavity. The first optical member can be part of a main sensor body, wherein the ferrule is affixed to the main sensor body. The first and third optical members can be directly affixed to one another, wherein at least one of the first and third optical members is $MgAl_2O_4$ spinel. At least one of the first and third optical members can be aluminum oxynitride (nominally $Al_{23}N_{27}O_5$). An anti-reflective coating can be included on at least one surface of the optical element.

The cavity can be defined in the first optical member. The first optical member can include a rim surrounding the cavity peripherally. The end plate can be affixed to the cavity rim.

The cavity can be defined in the third optical member. The third optical member can include a rim surrounding the cavity peripherally. The first optical member can be affixed to the cavity rim.

A ring can be affixed between the first and third optical members. The cavity can be bounded by the cavity ring and the first and third optical members.

A method of making a Fabry-Pérot optical cavity includes using a ceramic processing etching process to remove material from a first optical member to form the cavity therein, leaving a rim of the optical member surrounding the cavity peripherally. The method includes affixing a third optical member to the rim to enclose the cavity.

The first optical member can be of $MgAl_2O_4$ spinel or $Al_{23}N_{27}O_5$ aluminum oxynitride. The second optical member can be of $MgAl_2O_4$ spinel or $Al_{23}N_{27}O_5$ aluminum oxynitride. The third optical member can be a diaphragm configured to deflect more than the first optical member under external pressure changes.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figures 1, 2:
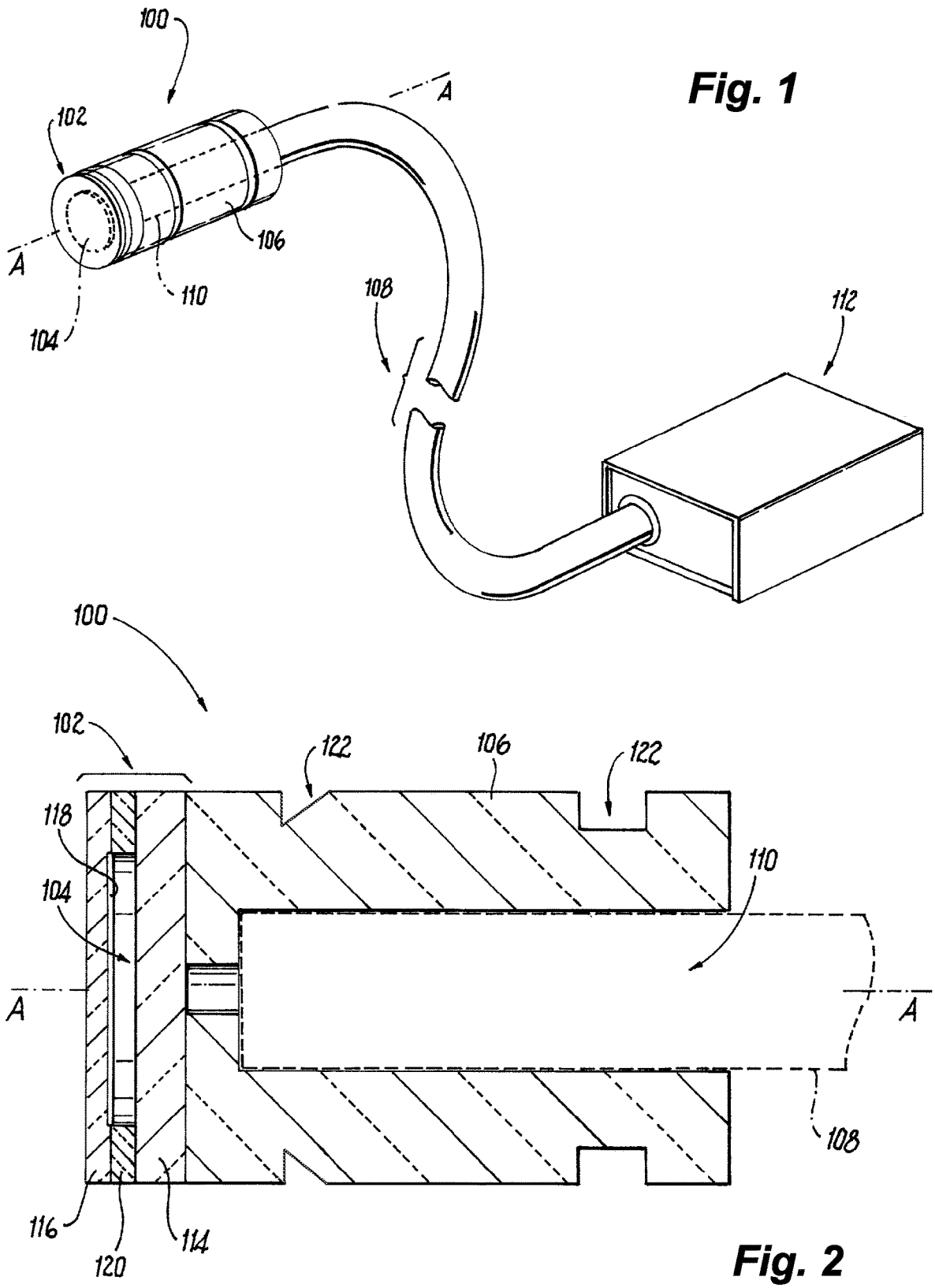
FIG. 1 is a schematic perspective view of an embodiment of a sensor assembly constructed in accordance with the present disclosure, showing the optical fiber, the interrogator, and the Fabry-Pérot optical element with sensor ferrule.
FIG. 2 is a schematic cross-sectional elevation view of the optical element and ferrule of FIG. 1.

Reference will now be made to the drawings wherein like reference numerals identify similar structural features or aspects of the subject disclosure. For purposes of explanation and illustration, and not limitation, a partial view of an embodiment of a sensor assembly in accordance with the disclosure is shown in FIG. 1 and is designated generally by reference character 100. Other embodiments of systems in accordance with the disclosure, or aspects thereof, are provided in FIGS. 2-5, as will be described. The systems and methods described herein can be used to facilitate manufacture of Fabry-Pérot sensors for optically based temperature and pressure measurements.

Figure 4:
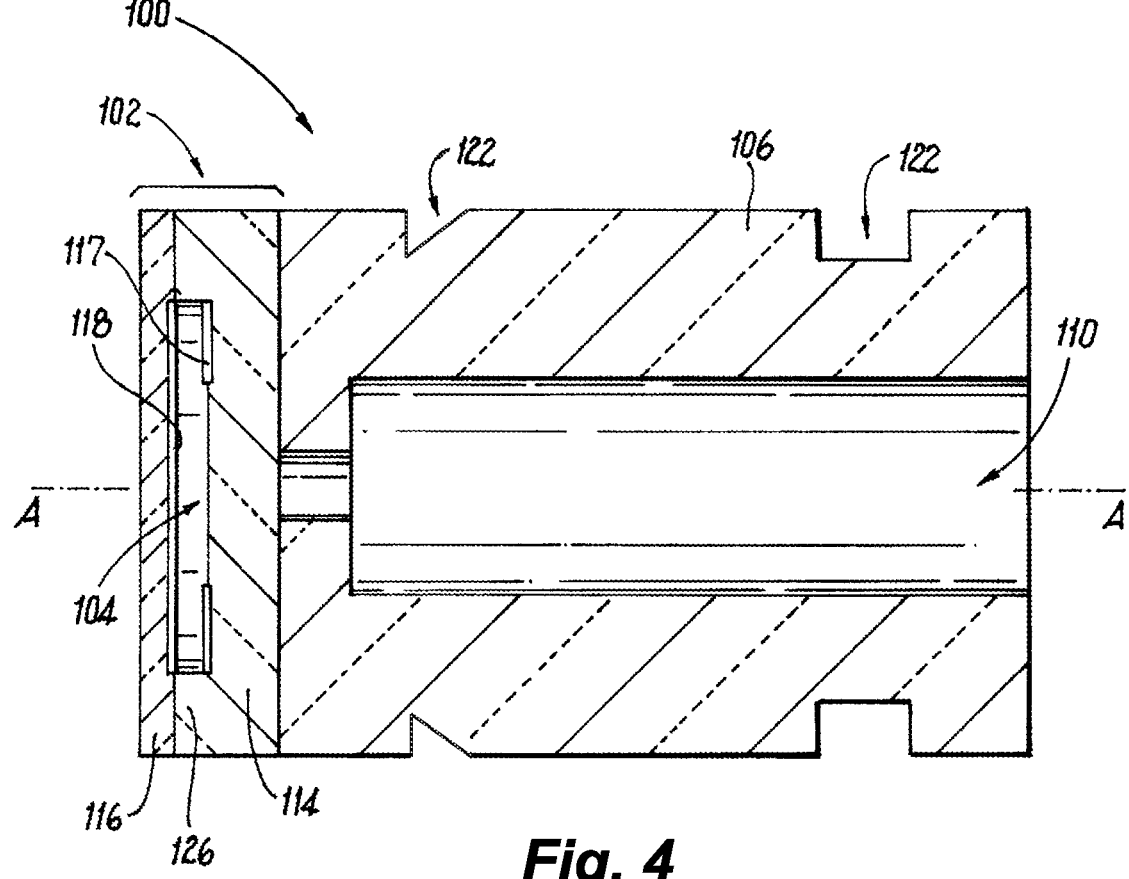
FIG. 4 is a schematic cross-sectional elevation view of an embodiment of the optical element and sensor ferrule of FIG. 2, showing the optical cavity formed in the first optical member, where the second optical member is the optical cavity itself and the third optical member is a diaphragm.
Figure 5:
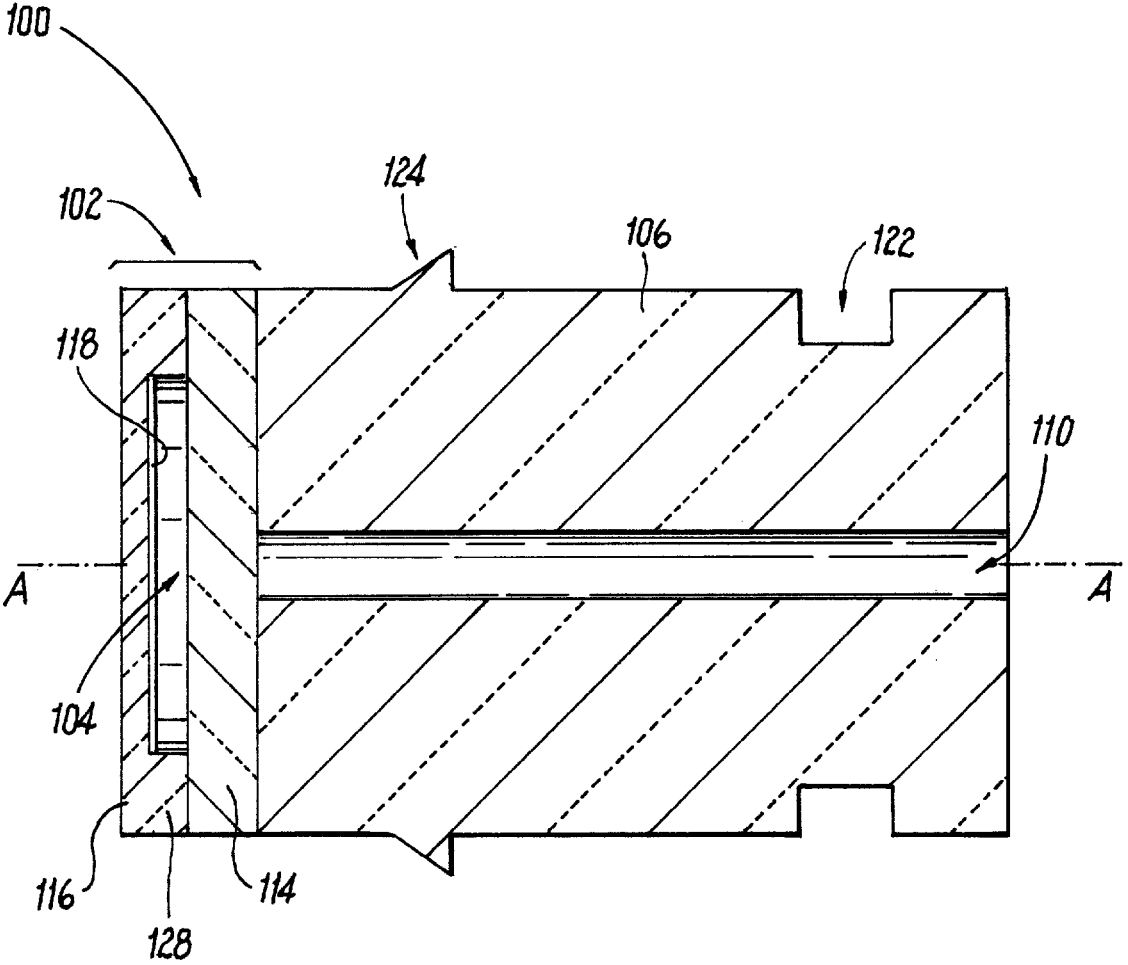
FIG. 5 is a schematic cross-sectional elevation view of an embodiment of the optical element and sensor ferrule of FIG. 2, showing the optical cavity formed by the third optical member, which is the diaphragm.

The Fabry-Pérot sensor, i.e. etalon, assembly 100 includes an optical element 102 defining a Fabry-Pérot optical cavity 104 therein. A sensor ferrule 106 is affixed to the optical element 102. The sensor ferrule 106 is physically connected to an optical fiber 108 which may have its own fiber ferrule, thereby aligning the optical fiber 108 optically with the cavity 104 thereby ensuring optical alignment with the optical element 102. The optical element 102 includes MgAl$_2$O$_4$ spinel, and the sensor ferrule 106 optionally includes MgAl$_2$O$_4$ spinel. The optical fiber 108 is affixed within a bore 110 the ferrule 106 optically aligned with the cavity 104. Additionally, bore 110 may also accommodate a fiber ferrule on the sensor end of 108 in order to facilitate optical alignment and spacing of the core of the optical fiber with the optical element 102 (FIG. 4 shows a cavity in the sensor ferrule that can accommodate a fiber with ferrule. FIG. 5 shows a configuration for a fiber without the fiber ferrule). An interrogator 112 is optically connected to the optical fiber 108, i.e. to an end of the optical fiber 108 opposite then end of the optical fiber 108 that is connected to the sensor ferrule 106. The interrogator 112 is thus configured to illuminate the optical cavity 104 through the optical fiber 108, to receive reflected spectrum from the cavity 104, and to measure temperature and/or pressure exhibited on the optical element 102 based on the reflected spectrum.

Figure 3:
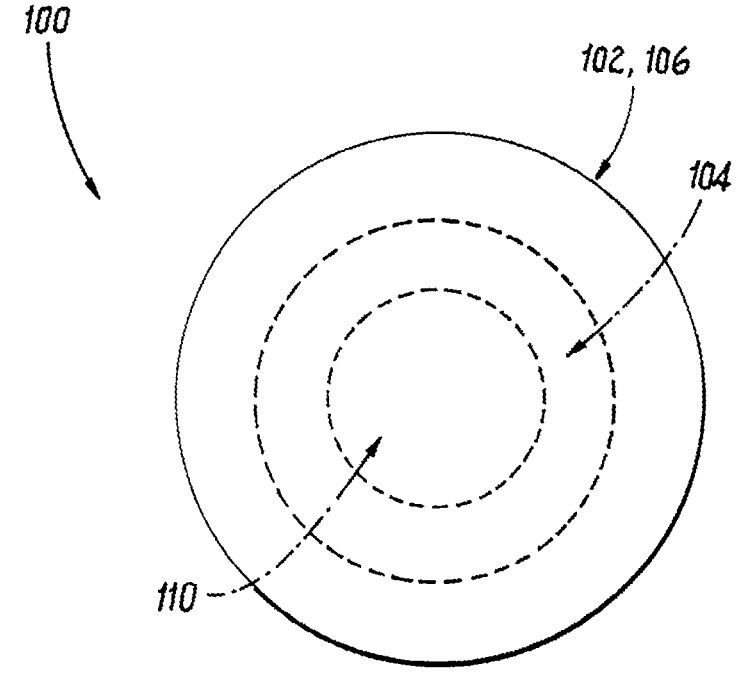
FIG. 3 is a schematic axial end view of the optical element and sensor ferrule of FIG. 2.

With reference now to FIG. 2, the sensor ferrule 106 defines a bore 110 for receiving the optical fiber 108. The bore 110 extends along a longitudinal axis A that extends through the cavity 104. The cavity 104 is defined axially between a first optical member 114 and a third optical member 116 that are spaced apart from one another along the longitudinal axis A. An optical path is comprised from the bore 110 and fiber 108 along the axis A, through the first optical member 114, and through the second optical member, cavity 104, subsequently reflecting off of the third optical member 116 and eventually passing back through the cavity 104 and back through the first optical member 114 into the bore 110 and fiber 108. Note that it is possible to directly couple the fiber core with the first optical member 114. FIG. 3 shows the cavity 104, bore 110, and the combination of the sensor ferrule 106 and optical element 102 as viewed into the longitudinal axis of FIG. 2. An anti-reflective coating can be included on at least one surface of the optical element 102 including the exposed surface of the first optical member 114 to the end of bore 110, which is most desirable, the inside cavity 104 which constitutes the second optical member, or the exterior axial face of the endplate. In certain application, it may be desirable to make use of a reflective coating 118 on the third optical member 116 in order to improve signal to noise response. Likewise, it is contemplated that a mirrored ring 117 on the surface of the first optical member 114 can be included, faying with the second optical member, cavity 104, provided that the mirrored surface of the ring does not interfere with light propagation along axis A of the end of bore 110 that interfaces with the first optical member 114.

With continued reference to FIG. 2, the third optical member 116 is an endplate, i.e. a diaphragm that can deflect under pressure changes, with an at least partially mirrored surface 118 inside the cavity 104 for increasing signal reflections through the cavity 104. The first optical member 114 constitutes a main sensor body, which is thicker/stiffer than the diaphragm of the optical member 116 such that it does not deflect under pressure changes as much as the diaphragm. The sensor ferrule 106 is affixed to the main sensor body 114. A cavity ring 120 is affixed between the first and third optical members 114, 116 hereby generating the pressure sensitive depth of the second optical member, optical cavity 104. The optical cavity 104 is bounded by the cavity ring 120 and by the first and third optical members 114, 116. At least one of cavity ring 120, the first optical member 114, and the third optical member 116 is transparent ceramic, e.g. spinel (magnesium aluminate, nominally MgAl$_2$O$_4$) or aluminum oxynitride (nominally Al$_{23}$N$_{27}$O$_5$). For instance, the cavity ring 120 can be of MgAl$_2$O$_4$ spinel. The sensor ferrule 106 includes external mating and locking features, i.e., radially inward extending features 122, or radially outward extending features 124 as shown in FIG. 5, configured for mechanical attachment of the sensor ferrule 106 to a housing or assembly.

With reference now to FIG. 4, the cavity ring 120 can be omitted since the first optical member 114 defines the unburdened optical cavity 104. The first and third optical members 114, 116 can be directly affixed to one another, wherein at least one of the first and third optical members 114, 116 is a single piece of transparent ceramic, e.g. spinel (magnesium aluminate, nominally MgAl$_2$O$_4$) or aluminum oxynitride (nominally Al$_{23}$N$_{27}$O$_5$). In FIG. 4, the second optical member, optical cavity 104, is defined in the first optical member 114, which includes a cavity rim 126 formed of the same transparent ceramic as the rest of the first optical member 114, surrounding the optical cavity 104 peripherally as does the ring 120 in FIG. 2. The end plate, i.e. optical member 116 or diaphragm, is affixed to the cavity rim 126 after the optical cavity 104 is formed in the first optical member 114 as described below. With reference now to FIG. 5, the optical cavity 104 can be defined by the second optical member 116 instead. The third optical member 116 in FIG. 5 hereby includes a cavity rim 128, i.e. of the same transparent ceramic as the rest of the second optical member 116. The cavity rim 128 in FIG. 5 surrounds the cavity peripherally just as the cavity rim 126 in FIG. 4 or the cavity ring in FIG. 2. In FIG. 5, the cavity rim 128 is affixed to the first optical member 114 after the cavity 118 is formed in the third optical member 116.

A method of making a Fabry-Pérot optical cavity as described above with respect to FIGS. 4-5 includes using a ceramic processing etching process to remove material from an optical member 114, 116 to form the optical member, optical cavity 104 therein, leaving a cavity rim 126, 128 of the optical member 114, 116 thereby surrounding the optical cavity 104 peripherally. The method includes affixing the remaining optical member 114, 116 (from which the cavity 104 was not formed) to the cavity rim 126, 128 to enclose the optical cavity 104. It is also contemplated that the optical cavity could be partially removed from both optical members 114, 116 without departing from the scope of this disclosure. Whether the first or third optical member 114, 116, or both, have material removed to form the optical cavity 104, the remaining structure of the third optical member 116 needs to have a diaphragm thin enough to deflect for the measurements of interest, as described above.

This is an approach to measuring pressure and temperature using a Fabry-Pérot cavity and optical fiber without the need to have all or any single crystal aluminum oxide (or sapphire, nominally Al$_2$O$_3$) elements. The optical element 102 enclosing the optical cavity 104 can be made of spinel ceramic or single crystal (nominally $MgAl_2O_4$) or aluminum oxynitride ceramic or single crystal (nominally $Al_{23}N_{27}O_5$). $MgAl_2O_4$ Spinel and aluminum oxynitride have similar transmittance of light over the wavelengths of light of interest (roughly 500 nm to 4 microns) as sapphire to support different fiber optic interrogation methodologies. As and additional improvement, $MgAl_2O_4$ spinel ceramic and aluminum oxynitride ceramic exhibit no birefringence due to their crystal structure (cubic) whereas sapphire has trigonal crystal structure which exhibits birefringence when incident light is off the c-plane. Thus, $MgAl_2O_4$ spinel and aluminum oxynitride do not suffer the burden of sapphire manufacturing that is associated with the c-plane alignment and tolerancing which would otherwise compromise light propagation through the device and henceforth reduce signal. Additionally, $MgAl_2O_4$ spinel and aluminum oxynitride can be manufactured using ceramic processing techniques versus the variations of the Czochralski process used for sapphire manufacturing.

Systems and method as disclosed herein provide potential benefits including the following: lower cost of materials, more cost effective manufacturing, ease of machining, and simpler housing attachments. This approach enables possible attachment of the optical element 102 to the ferrule 106 using bonding approaches similar to glass. The optical structures can be manufactured to high dimensional tolerances using bisque fire methods with secondary machining or machining in the green ceramic state (unfired) followed by sintering. Standard sintering processes may also be used that are lower in temperature ($<1650°$ C.) than the sapphire processing temperature (nominally $2070°$ C.). It is also contemplated that Hot Isostatic Press (HIP) methods can be utilized in different ways. One option would be to HIP the entire structure together, or HIP certain pieces of the assembly separately and sinter the pieces together to form a bond. In addition, combinations of ceramic and single crystal of either $MgAl_2O_4$ spinel or aluminum oxynitride can be used. This opens up a multitude of manufacturing options which are not available to components made out of sapphire.

In addition to the previously stated potential advantages over sapphire based sensors, the optical sensors disclosed herein are inherently advantageous over micro-electromechanical system (MEMS) sensors for the chosen measurand. Unlike MEMS sensors, the aforementioned optical sensors do not have preferential directionality (i.e., the measurements can be made regardless of sensor orientation).

The methods and systems of the present disclosure, as described above and as shown in the drawings, provide for facilitating the manufacture of Fabry-Pérot sensors for optically based temperature and pressure measurements. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A Fabry-Perot sensor assembly comprising:
  an optical element comprising:
    a first end opposite a second end relative to a longitudinal axis of the Fabry-Perot sensor assembly;
    a first optical member at the first end;
    a second optical member at the second end, wherein the second optical member comprises a diaphragm, and wherein the diaphragm deflects more than the first optical member to pressure changes external to the optical element;

a reflective coating connected to the diaphragm and facing the first optical member;
    an optical cavity between the first end and the second end; and
    a ring-shaped mirror attached to a surface of the first optical member and facing the second optical member, wherein the ring-shaped mirror does not interfere with light propagation at an end of a bore that interfaces with the first optical member and contains an optical fiber; and
  a sensor ferrule affixed to the first end of the optical element and defines the bore for receiving the optical fiber that extends along the longitudinal axis to the optical element, wherein the sensor ferrule is configured to physically connect to the optical fiber, optically aligning and spacing the optical fiber with the optical cavity, wherein the optical element includes $MgA1_2O_4$ spinel or aluminum oxynitride $Al_{23}N_{27}O_5$.

2. The assembly as recited in claim 1, further comprising the optical fiber affixed within the sensor ferrule optically aligned with the optical cavity along the longitudinal axis.

3. The assembly as recited in claim 2, further comprising an interrogator optically connected to the optical fiber, wherein the interrogator is configured to illuminate the cavity through the optical fiber, to receive reflected spectrum from the cavity, and to measure temperature and/or pressure of the cavity based on the reflected spectrum.

4. The assembly as recited in claim 1, wherein an optical path passes from the bore, through the first optical member, through the optical cavity, reflects off of the second optical member and passes back through the optical cavity and through the first optical member into the bore and back into the fiber.

5. The assembly as recited in claim 1, wherein at least one of the first and second optical members is $MgA1_2O_4$ spinel.

6. The assembly as recited in claim 1, wherein at least one of the first and second optical members is aluminum oxynitride $Al_{23}N_{27}O_5$.

7. The assembly as recited in claim 1, wherein the optical cavity recesses axially into the second optical member, forming a cavity rim that extends circumferentially around the optical cavity relative to the longitudinal axis, and wherein the diaphragm is connected to the cavity rim.

8. The assembly as recited in claim 1, wherein the optical cavity recesses axially into the first optical member, forming a cavity rim that extends circumferentially around the optical cavity relative to the longitudinal axis, and wherein the first optical member is connected to the cavity rim.

9. The assembly as recited in claim 1, further comprising anti-reflective coating on at least one surface of the optical element.

10. The assembly as recited in claim 1, further comprising a cavity ring between the first and second optical members and connected to both the first and second optical members, wherein the optical cavity is bounded by the cavity ring and the first and second optical members.

11. A method of making a Fabry-Perot optical element comprising:
  forming a first optical member comprising $MgAl_2O_4$ spinel or aluminum oxynitride $Al_{23}N_{27}O_5$;
  forming a second optical member comprising a diaphragm, and comprising $MgAl_2O_4$ spinel or aluminum oxynitride $Al_{23}N_{27}O_5$;
  creating a reflective coating on a first side of the second optical member, wherein the first side of the second optical member is formed by the diaphragm;

connecting a ring-shaped mirror on a first side of the first
optical member, wherein the first side of the first optical
member faces the first side of the second optical
member, wherein the ring-shaped mirror does not inter-
fere with light propagation at an end of a bore that
interfaces with the first optical member and contains an
optical fiber; and
connecting the first optical member to the second optical
member such that the first optical member forms a first
end of the optical element and the diaphragm of the
second optical member forms a second end of the
optical element, wherein the reflective coating of the
second optical member faces the first optical member,
and wherein an optical cavity is formed between the
first end and the second end.

12. The method of claim 11, further comprising:
joining a sensor ferrule to the first end of the optical
element wherein the sensor ferrule is configured to
physically connect to the optical fiber and optically
align an end of the optical fiber to the optical cavity, and
wherein the sensor ferrule may include $MgAl_2O_4$.

13. The method of claim 11, further comprising:
forming part of the first optical member through a ceramic
etching process.

14. The method of claim 11, further comprising:
forming part of the second optical member through a
ceramic etching process.

15. A Fabry-Perot sensor assembly comprising:
an optical element comprising:

a first end opposite a second end relative to a longitu-
dinal axis of the Fabry-Perot sensor assembly;
a first optical member at the first end, further compris-
ing:
a first side;
a second optical member at the second end, wherein the
second optical member comprises a diaphragm, and
wherein the diaphragm deflects more than the first
optical member to pressure changes external to the
optical element;
a reflective coating connected to the diaphragm and
facing the first side of the first optical member and
adjacent to the diaphragm;
a ring-shaped mirror connected to the first side of the
first optical member and facing the reflective coat-
ing, wherein the ring-shaped mirror does not inter-
fere with light propagation at an end of a bore that
interfaces with the first optical member and contains
the optical fiber; and
an optical cavity between the first optical member and
the second optical member; and
a sensor ferrule affixed to the first end of the optical
element, wherein the sensor ferrule is configured to
physically connect to the optical fiber, optically align-
ing and spacing the optical fiber with the optical cavity,
and wherein the optical element includes $MgAl_2O_4$
spinel or aluminum oxynitride $Al_{23}N_{27}O_5$.

* * * * *